United States Patent
Rottler et al.

(10) Patent No.: US 12,189,841 B2
(45) Date of Patent: Jan. 7, 2025

(54) INPUT PREDICTION FOR PRE-LOADING OF RENDERING DATA

(71) Applicant: Sony Interactive Entertainment LLC, San Mateo, CA (US)

(72) Inventors: Ben Honda Rottler, San Mateo, CA (US); Steven Trombetta, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/537,412

(22) Filed: Nov. 29, 2021

(65) Prior Publication Data

US 2023/0168736 A1 Jun. 1, 2023

(51) Int. Cl.
*G06F 3/01* (2006.01)
*A63F 13/358* (2014.01)
(Continued)

(52) U.S. Cl.
CPC ............ *G06F 3/013* (2013.01); *A63F 13/358* (2014.09); *A63F 13/52* (2014.09); *G06F 3/012* (2013.01);
(Continued)

(58) Field of Classification Search
CPC .......... G06F 3/013; G06F 3/012; G06F 3/017; G06F 2203/0381; G06F 3/011–013;
(Continued)

(56) References Cited

U.S. PATENT DOCUMENTS

2015/0061989 A1 3/2015 Timm et al.
2015/0277710 A1* 10/2015 Lee ..................... G06F 3/0488
715/822

(Continued)

FOREIGN PATENT DOCUMENTS

EP 3316075 A1 12/2018
KR 20140059109 A 5/2014

OTHER PUBLICATIONS

Notification of Transmittal of the ISR & Written Opinion PCT/US2022/050502, and the Written Opinion, dated Mar. 14, 2023.

*Primary Examiner* — Temesghen Ghebretinsae
*Assistant Examiner* — Ivelisse Martinez Quiles
(74) *Attorney, Agent, or Firm* — Penilla IP, APC

(57) ABSTRACT

Methods and systems are provided for fetching graphics data for rendering a scene presented on a display device. The method includes receiving gaze information for eyes of a user while the user is interacting with the scene. The method includes tracking gestures of the user while the user is interacting with the scene. The method includes identifying a content item in the scene as being a potential focus of interactivity by the user. The method includes processing the gaze information and the gestures of the user to generate a prediction of interaction with the content item by the user. The method includes processing a pre-fetching operation to access and load the graphics data into system memory in anticipation of the user interacting with the content item. In this way, when a prediction of interaction with a content item in the scene is determined based on the game actions (e.g., eye gaze, gestures, etc.) of the user, graphics data associated with the content item can be loaded into the system memory and can be used for further rendering of the content item which can help eliminate delays when the user interacts with the content item in the game scene.

15 Claims, 8 Drawing Sheets

(51) Int. Cl.
  *A63F 13/52* (2014.01)
  *G06T 1/60* (2006.01)
(52) U.S. Cl.
  CPC ................ *G06F 3/017* (2013.01); *G06T 1/60* (2013.01); *A63F 2300/8082* (2013.01)
(58) Field of Classification Search
  CPC .................... A63F 13/358; A63F 13/52; A63F 2300/8082; A63F 13/219; A63F 13/426; A63F 13/428; A63F 13/69; A63F 13/213; G06T 1/60
  See application file for complete search history.

(56) References Cited

U.S. PATENT DOCUMENTS

| | | | |
|---|---|---|---|
| 2016/0284134 | A1 | 9/2016 | Kamhi et al. |
| 2016/0291674 | A1 | 10/2016 | Timm et al. |
| 2017/0091549 | A1* | 3/2017 | Gustafsson ............. G06F 3/013 |
| 2017/0357308 | A1 | 12/2017 | Timm et al. |
| 2018/0150999 | A1* | 5/2018 | Inoguchi ................. G06F 3/011 |
| 2018/0232049 | A1* | 8/2018 | Thunström ............. G06F 3/013 |
| 2018/0260020 | A1 | 9/2018 | Kamhi et al. |
| 2018/0286105 | A1 | 10/2018 | Surti et al. |
| 2018/0292896 | A1* | 10/2018 | Hicks ....................... G06F 3/013 |
| 2018/0350032 | A1* | 12/2018 | Bastani .................... G06T 15/20 |
| 2019/0147640 | A1 | 5/2019 | Surti et al. |
| 2019/0250773 | A1* | 8/2019 | Miyaki ............... G06F 3/04815 |
| 2019/0286216 | A1 | 9/2019 | Timm et al. |
| 2019/0294312 | A1 | 9/2019 | Rohrbacher |
| 2019/0362557 | A1 | 11/2019 | Lacey et al. |
| 2020/0166987 | A1 | 5/2020 | Kamhi et al. |
| 2020/0409481 | A1* | 12/2020 | Henrikson ............. G06F 3/013 |
| 2021/0056764 | A1 | 2/2021 | Lacey et al. |
| 2021/0286216 | A1 | 9/2021 | Chen et al. |
| 2022/0005259 | A1 | 1/2022 | Surti et al. |
| 2022/0236787 | A1 | 7/2022 | Kamhi et al. |
| 2022/0377304 | A1* | 11/2022 | Duanmu ............ H04N 21/2402 |

\* cited by examiner

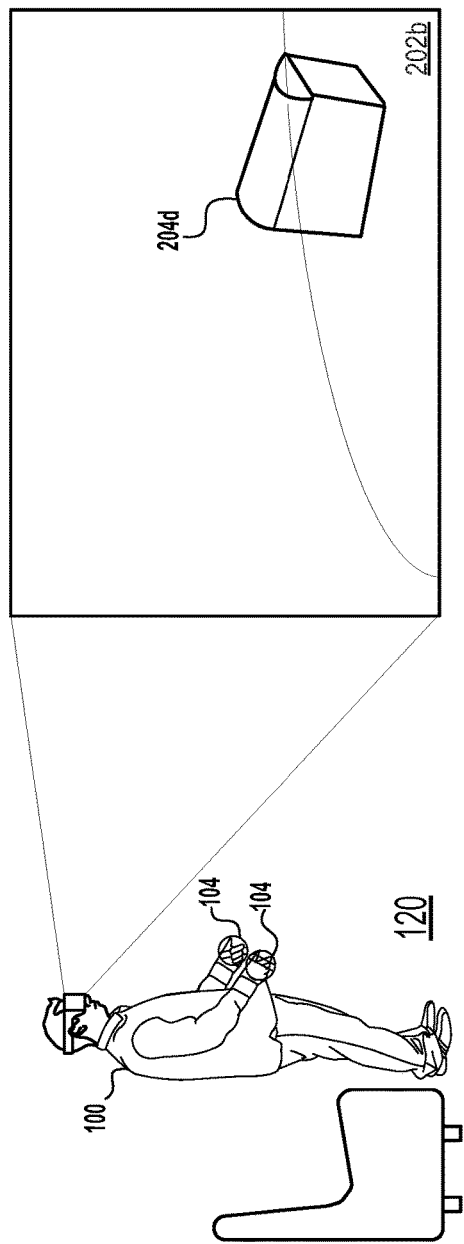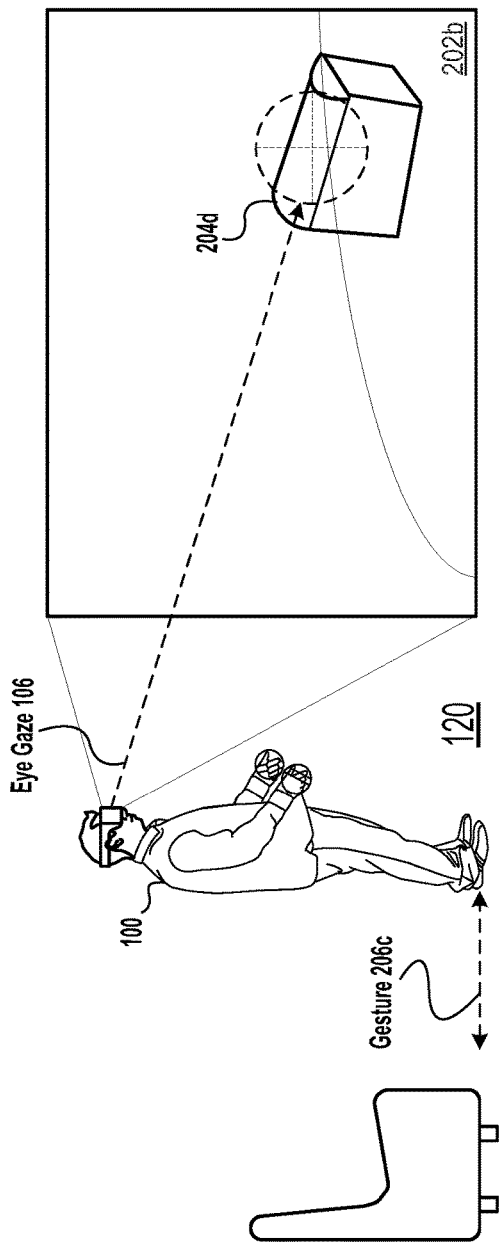

Eye Gaze Information, Gestures & Predicted Interaction Table — 408

| Eye Gaze Information | Gestures | Game Content Item | Game Scene Context | Prediction of Interaction |
|---|---|---|---|---|
| Eyes/pupils enlarged | Arm/hands pointed at content item | Treassure Chest | Discovered Treassure Chest | Open treassure chest to explore contents |
| Eye wide open | Body position proximate to content item | Sculpture of the Statue of Liberty | Shopping at flea market | Touch and look at details |
| Eyes blink fast | Fidgeting With Hands | Exit Door | Fighting the Cyberdemon | Runs toward exit door to escape |
| Eye pupils constrict | Stroking Chin | Puzzle | Solving puzzle | Viewing details of puzzle and attempting to solve |
| ... | ... | ... | ... | ... |
| Eyes move up and to the right | Clenched fist | Security Guard | Robbing a bank with security guard present | Disarming security guard |

FIG.5

INPUT PREDICTION FOR PRE-LOADING OF RENDERING DATA

BACKGROUND

1. Field of the Disclosure

The present disclosure relates generally to fetching graphics data that is used for rendering a game scene, and more particularly to methods and systems for fetching and loading the graphics data into system memory based on the eye gaze and gestures of a user.

2. Description of the Related Art

The video game industry has seen many changes over the years. In particular, the virtual reality (VR) gaming industry has seen a tremendous growth over the years and is expected to continue growing at a compound annual growth rate. VR gaming can provide a player with an immersive experience where the player is immersed in a three-dimensional (3D) artificial environment while interacting with VR games scenes that are introduced to the player. A growing trend in the VR gaming industry is to improve and develop unique ways that will enhance the experience of VR gaming.

For example, during gameplay of a player and when the player is immersed in the VR environment, the player can explore and interact with various virtual objects in the VR environment. In certain cases, as the player navigates through the VR scenes and interact with the virtual objects in the VR scenes, the player may experience a delay in the rendering of the VR scenes because the graphics are highly detailed which requires a significant amount of computational resources to render the virtual objects and to ensure smooth transitions throughout the player's interaction with the VR scenes. Unfortunately, some player may find that the delay in the rendering of the VR scenes is bothersome and results in an unauthentic VR experience. As a result, players may not be provided with a fully immersive VR experience which may result in the players not wanting to continue with their gameplay.

It is in this context that implementations of the disclosure arise.

SUMMARY

Implementations of the present disclosure include methods, systems, and devices relating to fetching graphics data for rendering a game scene that is presented on display. In some embodiments, methods are disclosed to that enable the fetching and loading of the graphics data into system memory based on the game actions and gestures of a user playing a (VR) video game. For example, a user playing a VR video game may be immersed in the VR environment of the VR game. During the gameplay of the user, as the user performs various game actions while interacting with the VR scenes, the game actions of the user may infer and help predict that the user is focused on particular content items within the scene and have an interest in interacting with the particular content items. In one example, game actions such as the eye gaze of the user and the gestures (e.g., head movement, hand movement, body movement, position, body language signal, etc.) of the user may indicate that the user has an interest in interacting with a particular content item in the game scene.

Thus, in one embodiment, the system is configured to process the eye gaze and the gestures of the user to generate a prediction of interaction with the content item. With the generated prediction of interaction, the system may include a pre-fetching operation that is configured to pre-fetch graphics data that is associated with the content item and load the graphics data into system memory in in anticipation of the user interacting with the content item. Since the game actions of the user are analyzed and tracked to identify content items that the user may have an interest in, the methods disclosed herein outline ways of fetching graphics data associated for a particular content item and loading the graphics data into system memory in anticipation that the user interacts with the content item. Thus, by having the graphics data stored in the system memory, the graphics data can be quickly accessible by the system and used for rendering the content item or rendering additional details on the content item to enhance the image quality. In this way when a system renders a particular content item, delays can be eliminated.

In one embodiment, a method for fetching graphics data for rendering a scene presented on a display device is provided. The method includes receiving gaze information for eyes of a user while the user is interacting with the scene. The method includes tracking gestures of the user while the user is interacting with the scene. The method includes identifying a content item in the scene as being a potential focus of interactivity by the user. The method includes processing the gaze information and the gestures of the user to generate a prediction of interaction with the content item by the user. The method includes processing a pre-fetching operation to access and load the graphics data into system memory in anticipation of the user interacting with the content item. In this way, when a prediction of interaction with a content item in the scene is determined based on the game actions (e.g., eye gaze, gestures, etc.) of the user, graphics data associated with the content item can be loaded into the system memory and can be used for further rendering of the content item which can help eliminate delays when the user interacts with the content item in the game scene.

In another embodiment, a system for fetching graphics data for rendering a scene presented on a display is provided. The system includes receiving, by a server, gaze information for eyes of a user while the user is interacting with the scene. The system includes tracking, by the server, gestures of the user while the user is interacting with the scene. The system includes identifying, by the server, a content item in the scene as being a potential focus of interactivity by the user. The system includes processing, by the server, the gaze information and the gestures of the user to generate a prediction of interaction with the content item by the user. The system includes processing, by the server, a pre-fetching operation to access and load the graphics data into system memory in anticipation of the user interacting with the content item.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIGS. 3A-3C illustrate another embodiment of a view into a virtual environment of a user showing the user interacting with a virtual reality scene while wearing an HMD, in accordance with an implementation of the disclosure.

FIG. 5 illustrates an embodiment of table illustrating eye gaze information and gestures of a user that are tracked during gameplay of the user, and a generated prediction of interaction with the content item by the user, in accordance with an implementation of the disclosure.

DETAILED DESCRIPTION

Figure 1A:
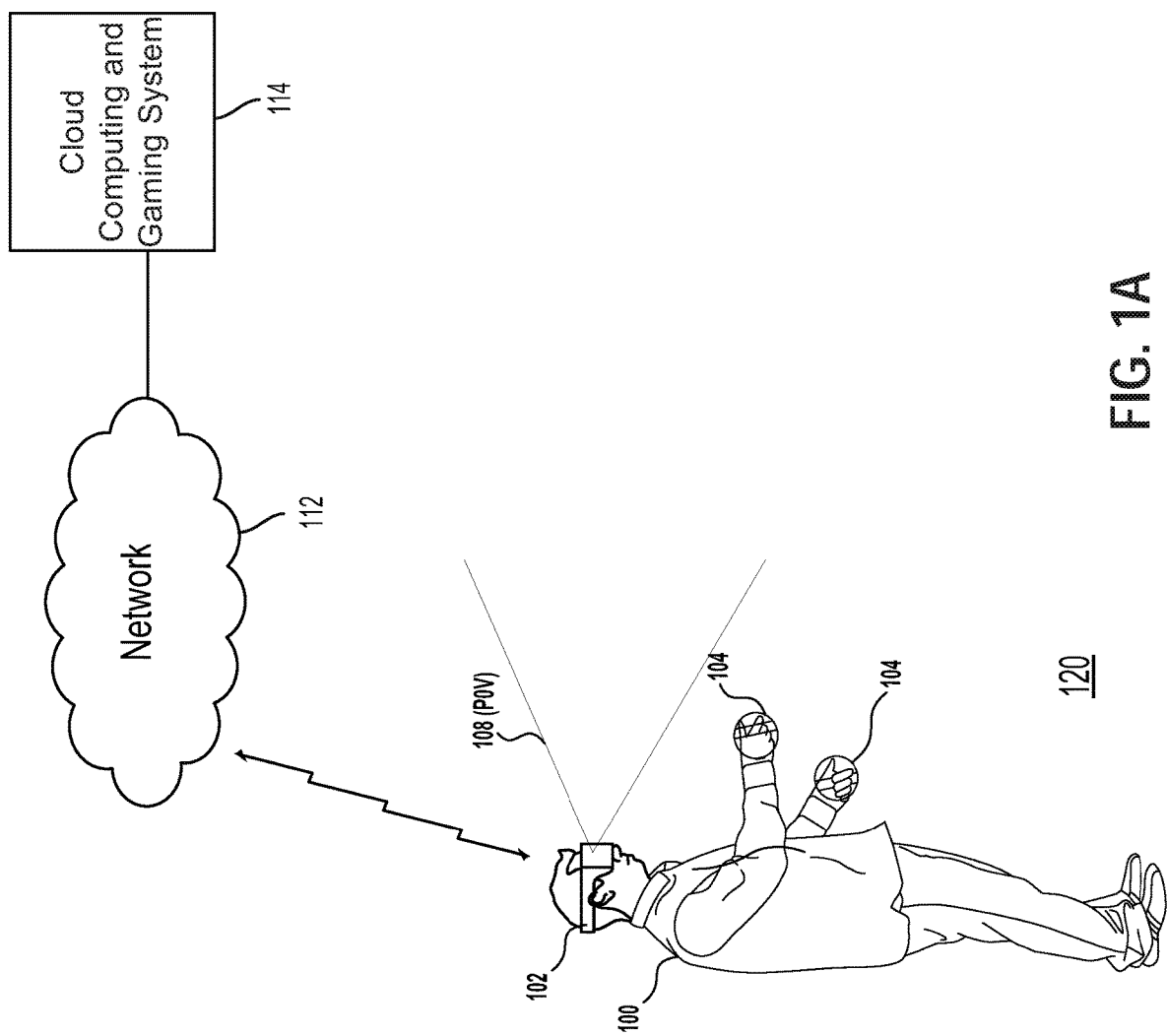
FIG. 1A illustrates an embodiment of a system for interaction with a virtual environment via a head-mounted display (HMD), in accordance with an implementation of the disclosure.

The following implementations of the present disclosure provide methods, systems, and devices for fetching graphics data that is used for rendering a game scene that is presented on display. In particular, the display can be a Head Mounted Display (HMD) of a user playing a virtual reality (VR) video game or a display associated with a device of the user. In one embodiment, the graphics data corresponds to one or more content items in the game scene and can be used for rendering additional details related to the content items. In some embodiments, the content items are identified based on the game actions of the user while interacting with the game scenes. For example, during the gameplay of the user, game actions of the user such as eye gaze and gestures (e.g., body movements) are tracked in real-time while the user interacts with the game scenes. In one example, the eye gaze of the user and the gestures of the user are processed to identify content items in the game scene that the user is potentially interested in interacting with. Accordingly, graphics data corresponding to the identified content items is pre-fetched and loaded into system memory in anticipation of the user interacting with the content items. Thus, by having the graphics data stored in the system memory, the graphics data can be quickly accessible by the system and used for rendering specific content items or rendering additional details related to the content items. In this way, delays associated with rendering various content items in the game scenes can be eliminated which in turn can enhance the gaming experience of users by providing the users with an interrupted VR gaming experience.

By way of example, in one embodiment, a method is disclosed that enables fetching graphics data that is used for rendering a scene that is presented on a display. The method includes receiving gaze information for eyes of a user while the user is interacting with the scene. In one embodiment, the method may further include tracking gestures of the user while the user is interacting with the scene. In another embodiment, the method may include identifying a content item in the scene as being a potential focus of interactivity by the user. In some embodiments, the method includes processing the gaze information and the gestures of the user to generate a prediction of interaction with the content item by the user. In other embodiments, the method includes processing a pre-fetching operation to access and load the graphics data into system memory in anticipation of the user interacting with the content item. It will be obvious, however, to one skilled in the art that the present disclosure may be practiced without some or all of the specific details presently described. In other instances, well known process operations have not been described in detail in order not to unnecessarily obscure the present disclosure.

With the above overview in mind, the following provides several example figures to facilitate understanding of the example embodiments.

FIG. 1A illustrates an embodiment of a system for interaction with a virtual environment via a head-mounted display (HMD), in accordance with implementations of the disclosure. An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space. For example, the user may see a three-dimensional (3D) view of the virtual space when facing in a given direction, and when the user turns to a side and thereby turns the HMD likewise, then the view to that side in the virtual space is rendered on the HMD.

As illustrated in FIG. 1A, a user 100 is shown physically located in a real-world space 120 wearing an HMD 102 and operating interface objects 104 to provide input for the video game. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user, and may also provide viewing with three-dimensional depth and perspective.

In some embodiments, the HMD 102 may provide a user with a game play point of view (POV) 108 into the VR scene. Accordingly, as the user 100 turns their head and looks toward different regions within the VR environment, the VR scene is updated to include any additional virtual objects that may be within the game play POV 108 of the user 100. In one embodiment, the HMD 102 may include a gaze tracking camera that is configured to capture images of the eyes of the user 100 while the user interacts with the VR scenes. The gaze information captured by the gaze tracking camera may include information related to the gaze direction of the user 100 and the specific virtual objects and content items in the VR scene that the user 100 is focused on or is interested in interacting with. Accordingly, based on the gaze direction of the user 100, the system may detect specific virtual objects and content items that may be of potential focus to the user where the user has an interest in interacting and engaging with, e.g., game characters, game objects, game items, etc.

In some embodiments, the HMD 102 may include an externally facing camera that is configured to capture images of the real-world space 120 of the user 100 such as the body movements of the user and any real-world objects that may be located in the real-world space. In some embodiments, the images captured by the externally facing camera can be analyzed to determine the location/orientation of the real-world objects relative to the HMD 102. Using the known location/orientation of the HMD 102, the real-world objects, and inertial sensor data from the HMD, the gestures and movements of the user can be continuously monitored and tracked during the user's interaction with the VR scenes. For example, while interacting with the scenes in the game, the user 100 may make various gestures such as pointing and walking toward a particular content item in the scene. In one embodiment, the gestures can be tracked and processed by the system to generate a prediction of interaction with the particular content item in the game scene. In other embodiments, the HMD 102 may include one or more lights which can be tracked to determine the location and orientation of the HMD 102.

As noted above, the user 100 may operate interface objects 104 to provide input for the video game. In various implementations, the interface objects 104 include a light which can be tracked, and/or inertial sensor(s), to enable determination of the interface object's location and orientation and tracking of movements. The way the user interfaces with the virtual reality scene displayed in the HMD 102 can vary, and other interface devices in addition to interface object 104, can be used. For instance, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 102.

In the illustrated implementation, the HMD 102 is wirelessly connected to a cloud computing and gaming system 114 over a network 112. In one embodiment, the cloud computing and gaming system 114 maintains and executes the video game being played by the user 100. In some embodiments, the cloud computing and gaming system 114 is configured to receive inputs from the HMD 102 and the interface objects 104 over the network 112. The cloud computing and gaming system 114 is configured to process the inputs to affect the game state of the executing video game. The output from the executing video game, such as video data, audio data, and haptic feedback data, is transmitted to the HMD 102 and the interface objects 104. For example, video and audio streams are provided to the HMD 102, whereas a haptic/vibration feedback command is provided to the interface objects 104. In other implementations, the HMD 102 may communicate with the cloud computing and gaming system 114 wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations.

Figure 1B:
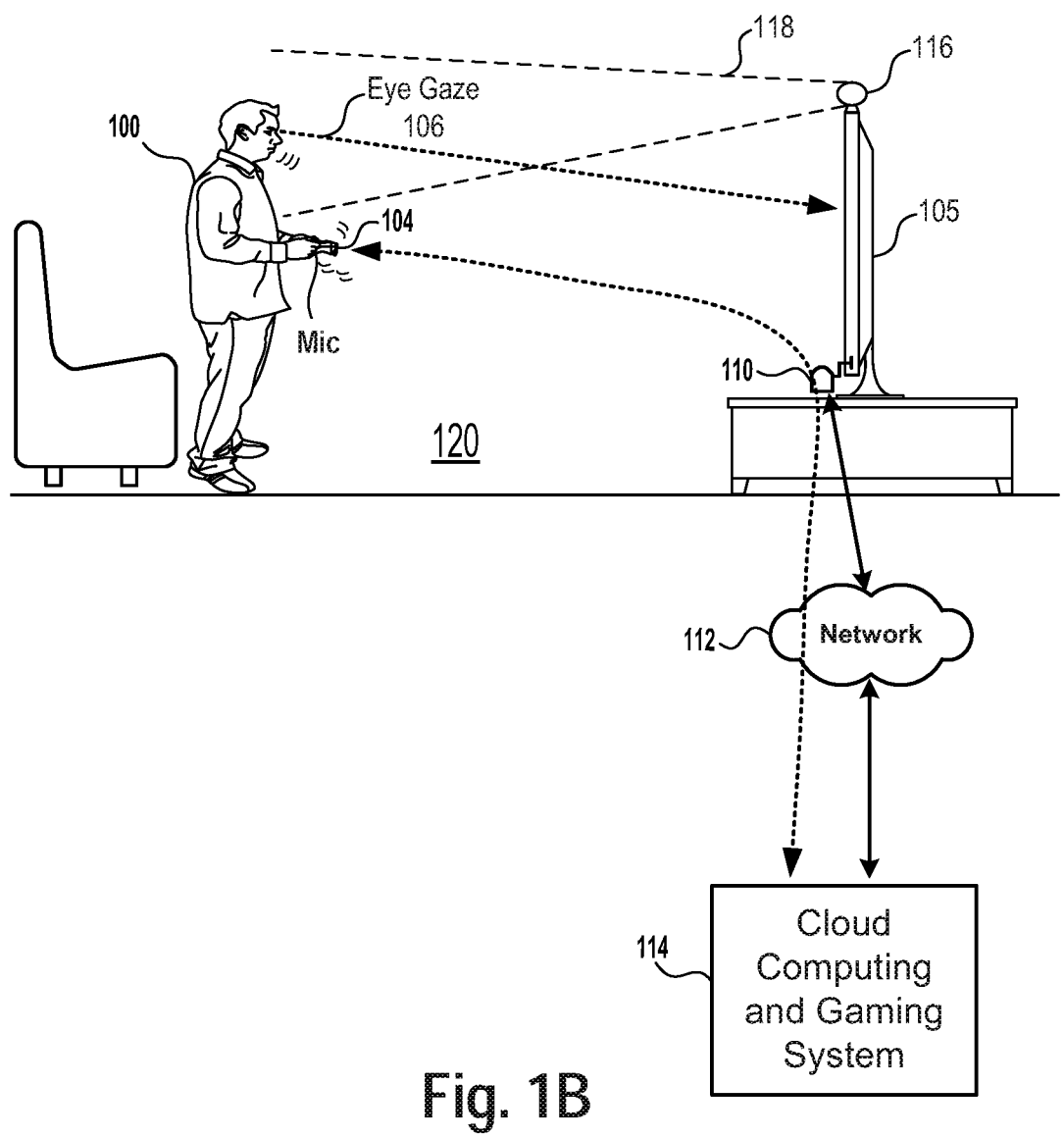
FIG. 1B illustrates an embodiment of a system for tracking gaze information and gestures of a user 100 while the user interacts with game scenes during gameplay, in accordance with an implementation of the disclosure.

FIG. 1B illustrates an embodiment of a system for tracking gaze information and gestures of a user 100 while the user interacts with game scenes during gameplay. As illustrated in the figure, the user 100 is shown standing in front of a display 105 playing a game. The user 100 can play the game using an interface object 104 which provides input to the game. A computer 110 is connected to the display 105 through a wire connection. A camera 116 is positioned on top of the display 105 and configured to capture the user playing the game while the user is immersed in the gameplay. The camera 116 includes a camera point of view (POV) 118 that captures the user 100 and objects within its POV. According to the embodiment shown, the computer 110 can communicate with a cloud computing and gaming system 114 through network 112.

The camera 116 may include gaze tracking to enable tracking of the gaze of the user 100. The camera 116 is configured to capture images of the user's eyes, which are analyzed to determine the eye gaze 106 of the user 100. In some embodiments, the camera 116 may be configured to capture and process gestures and body movements of the user 100 during the gameplay. For example, during the gameplay of the user 100, the user may encounter various content items (e.g., game objects, game characters, etc.) that the user is interested in interacting with. When the eye gaze 106 is focused on a particular content item while the user moves in a direction toward the content item, the noted actions (e.g., eye gaze, body movement) may be processed and the particular content item in the game scene may be identified as being a potential focus of interactivity by the user. Accordingly, the system is configured to track the eye gaze, gestures, and body movements of the user 100 during gameplay which can be used to generate a prediction of interaction with a particular content item in the game scene.

In other embodiments, the camera 116 may be configured to track and capture a facial expression of the user 100 during the gameplay which is analyzed to determine an emotion associated with the facial expression. In some embodiments, the camera 116 may be mounted on a 3-axis gimbal that allows the camera to rotate freely about any axis to enable the capturing of various angles of the user. In one embodiment, the camera 116 may be a pan-tilt-zoom camera which can be configured to automatically zoom in and track the user's face and body as the user moves during the gameplay.

In some embodiments, the interface object 104 can include one or more microphones to capture sound from the real-world space 120 where the game is being played. The sound captured by the microphone may be processed to identify the location of a sound source. Sound from an identified location can be selectively utilized or processed to the exclusion of other sounds not from the identified location. This information can be utilized in various ways, including exclusion of unwanted sound sources, association of a sound source with a visual identification, etc. In some implementations, the interface object 104 can be tracked by tracking lights included in the interface object 104, or tracking of shapes, sensors, and inertial data associated with the interface object 104. In various implementations, the interface object 104 includes a light which can be tracked, and/or inertial sensor(s), to enable determination of the controller's location and orientation and tracking of movements.

After the computer 110 captures the data (e.g., eye gaze data, gesture information, body movement data, face expression data, voice inflection data, inertial sensor data, controller input data) associated with the user 100 during the gameplay, the data can be transmitted to the cloud computing and gaming system 114 through network 112. In some embodiments, the cloud computing and gaming system 114 can receive, process, and execute the various data from the user 100 to generate a prediction of interaction with the content item by the user. In some embodiments, the cloud computing and gaming system 114 may utilize a pre-fetching operation to access and load graphics data corresponding to the content item into system memory in anticipation of the user interacting with the content item. In some embodiments, the graphics data correspond to the specific content item in the scene that the user has an interest in interacting with and the graphics data can be used to render the specific content item or to further enhance the image quality (e.g., coarseness, curvature, geometry, vertices, depth, color, lighting, shading, texturing, motion, etc.) of the specific content item.

Figure 2A:
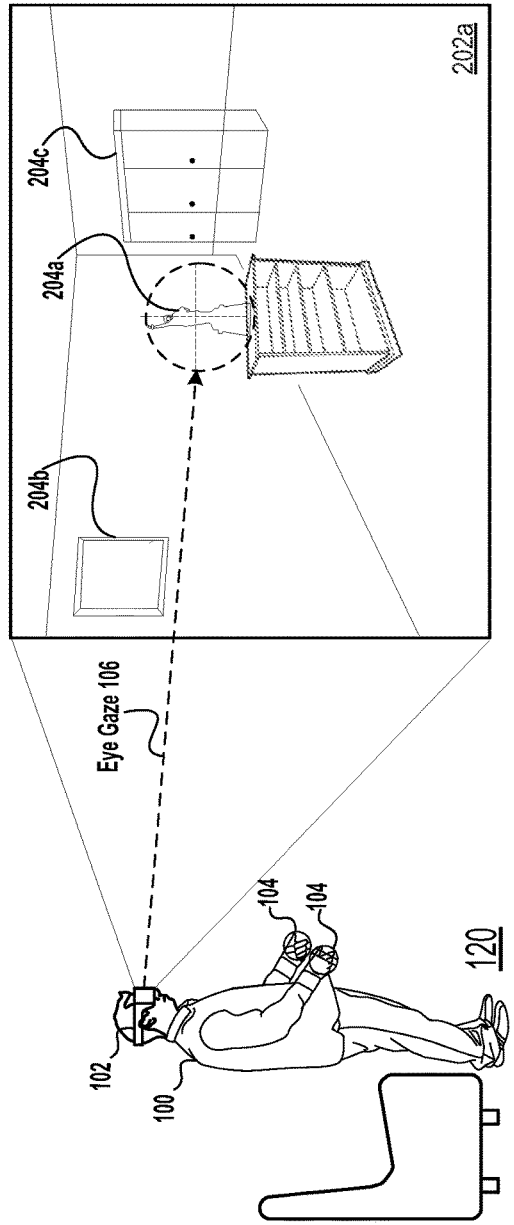
FIG. 2A illustrates an embodiment of a view into a virtual environment of a user showing the user interacting with a virtual reality scene while wearing an HMD, in accordance with an implementation of the disclosure.

FIG. 2A illustrates an embodiment of a view into a virtual environment of a user 100 showing the user 100 interacting with a virtual reality scene 202*a* while wearing an HMD 102. As the user 100 holds the interface objects 104 or uses their arms and hands to interact with the virtual reality scene 202, the system is configured to track the gestures of the user 100 and the eye gaze 106 of the user. For example, in the illustration shown in FIG. 2A, the virtual reality scene 202*a* includes a plurality of content items 204*a*-204*c* that are rendered in the scene. As shown, content item 204*a* represents a sculpture of the statue of liberty, content item 204*b* represents a picture frame, and content item 204*c* represents a wardrobe closet. In particular, the sculpture of the statue of liberty is shown having a low image quality (e.g., low resolution) where the wireframe of the statue is rendered in the scene. During the user's interaction with the virtual reality scene 202, since the eye gaze 106 of the user is directed at content item 204*a* (e.g., sculpture of the statue of liberty), the system may identify the content item 204*a* as being a potential focus of interactivity by the user 100.

In some embodiments, the system is configured to process the gestures of the user and gaze information such as the eye gaze 106 to generate a prediction of interaction with the content item 204*a* (e.g., sculpture of the statue of liberty) by the user 100. In one embodiment, the gestures of the user may include user actions such as head movement, hand movement, body movement, body language, and position of the user. For example, while the eye gaze 106 of the user is focused on the sculpture, the gestures of the user may indicate that the user 100 is pointing and walking toward the sculpture. Accordingly, using the gaze information and the gesture information, the system may generate a prediction of interaction with the content item. In this example, the prediction of interaction may include the user wanting to hold and feel the sculpture.

Figure 2B:
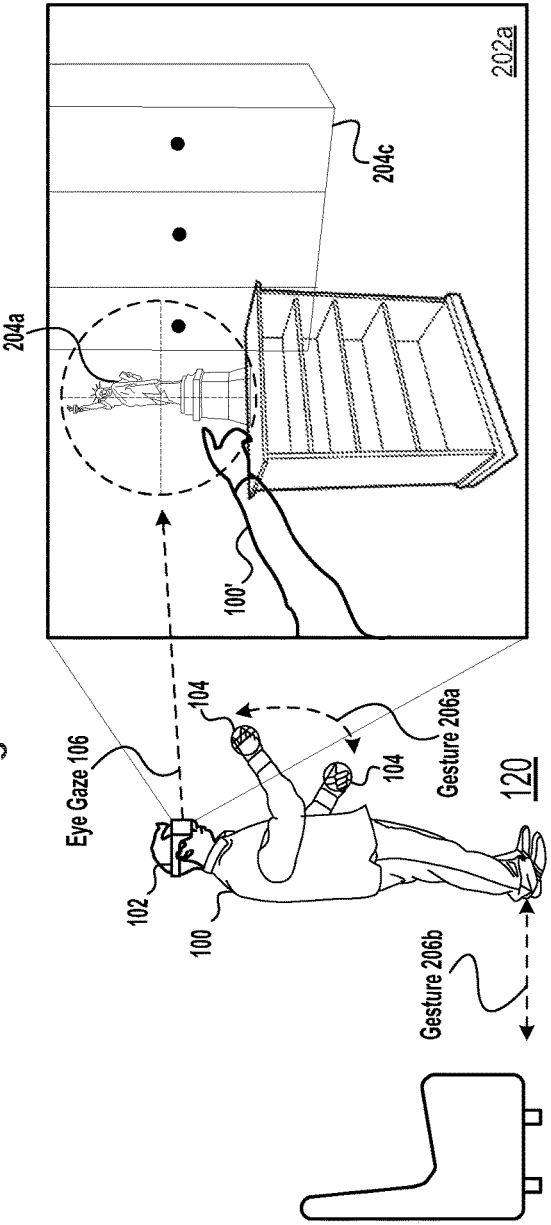
FIG. 2B illustrates an embodiment of the virtual environment of user shown in FIG. 2A showing the user interacting with the virtual reality scene where the virtual arm of the user is reaching toward a content item, in accordance with an implementation of the disclosure.

FIG. 2B illustrates an embodiment of the virtual environment of user 100 shown in FIG. 2A showing the user 100 interacting with the virtual reality scene 202*a* where the virtual arm 100' of the user is reaching toward the content item 204*a* (e.g., sculpture of the statue of liberty). As illustrated in FIG. 2B, the gestures 204*a*-204*b* of the user 100 are tracked while the user is interacting with the virtual reality scene 202*a*. While the eye gaze 106 of the user 100 is focused and directed at the content item 204*a*, gesture 206*a* illustrates the user reaching their arm in the real-world space 120 to attempt to touch the content item 204*a*. As further illustrated in the figure, gesture 206*b* illustrates the body position of the user 100 at a position that is more proximate to the content item 204*a* compared to the body position of the user shown in FIG. 2A. Accordingly, using the eye gaze 106 of the user 100 and the gestures 204*a*-204*b* of the user 100, the system can predict one or more interactions types that the user may be interested in, e.g., touching the sculpture, grabbing the sculpture, looking at the sculpture at a closer distance to view the details, etc.

In some embodiments, one or more actions of the user can be used to predict an interaction with a content item in the scene, e.g., user inputs from any device can be used to pre-render content related to expected user actions. In other embodiments, sequences of gestures 204 and actions of the user 100 can predict an interaction with a content item which can lead to predictable outcomes in the scene to allow the pre-rendering of the content item more effectively.

In some embodiments, when a content item 204 is identified as being a potential focus of interactivity and a prediction of interaction with the content item 204 is generated, the system may utilize a pre-fetching operation to access and load graphics data into system memory. In one embodiment, the graphics data corresponds to the content item 204 that the system identifies as a potential focus of interactivity in which the user is anticipated to interact with.

In one embodiment, the system may include a central processing unit (CPU) and a graphics processing unit (GPU) that is configured to access the graphics data from the system memory for rendering additional details corresponding to the identified content item 204. In one example, the graphics data may include data defining the geometry, vertices, depth, color, lighting, shading, texturing, motion, etc. for the content item 204. For example, referring simultaneously to FIGS. 2A and 2B, the eye gaze 106 of the user is focused on the content item 204*a* (e.g., sculpture of the statue of liberty). As the user 100 walks toward sculpture and uses their hand to reach for the sculpture (e.g., gestures 204*a*-204*b*), the system is configured to access the graphics data corresponding to the sculpture and use the graphics data to render additional details on the sculpture to increase the image quality of the sculpture.

As shown in FIG. 2B, the user is located at a distance proximate to the content item 204*a* where the user can touch and interact with the content item 204*a*. As further shown, the content item 204*a* includes a greater amount of detail and an enhanced image quality (e.g., depth, shading, texturing, etc.) compared the content item 204*a* shown in FIG. 2A. In one embodiment, the amount of graphics data that is used for rendering the content item is based on a distance that the user is relative to the content item. For example, the system is configured to initiate the rendering of the details for the content item 204*a* when the user begins moving toward the content item 204*a* and the amount of graphics data used for rendering the content item 204*a* increases as the user gets closer to the content item 204*a*. In other embodiments, the system is configured to initiate the rendering of the details for the content item 204*a* when the eye gaze 106 of the user is focused and maintained on the content item 204*a*. In one embodiment, the amount of graphics data used for rendering the details for the content item is based on a length of time the eye gaze of the user is maintained on the content item and the intensity of the eyes of the user.

Figure 3C:
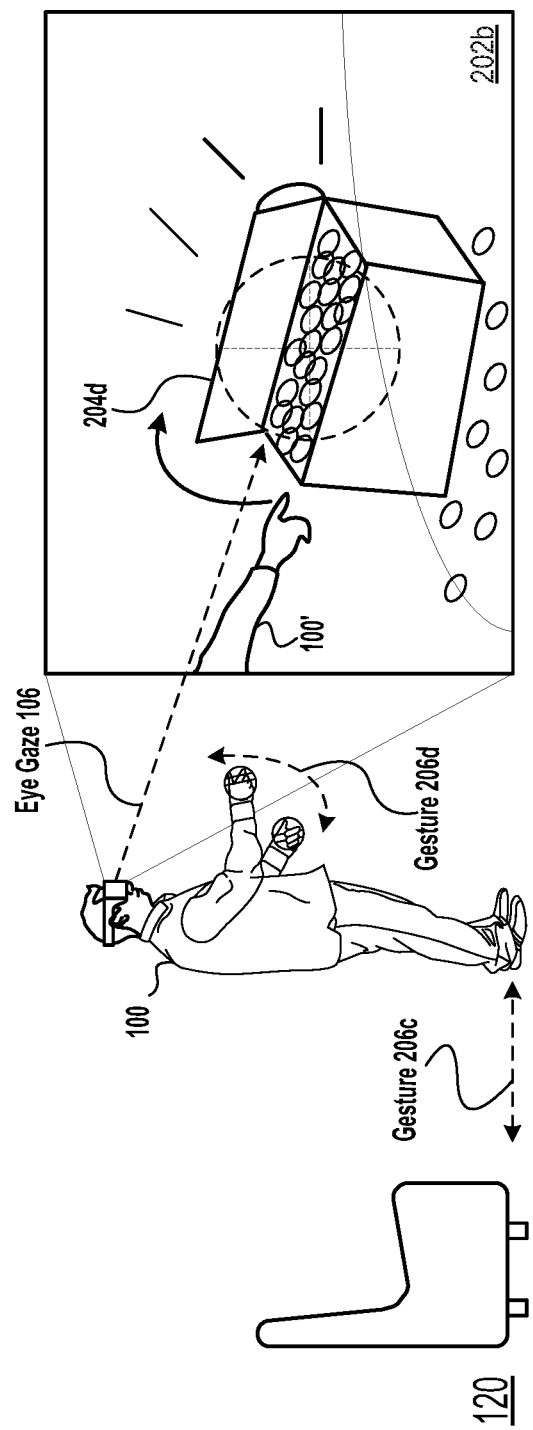

FIGS. 3A-3C illustrate another embodiment of a view into a virtual environment of a user 100 showing the user 100 interacting with a virtual reality scene 202*b* while wearing an HMD 102. As illustrated in FIG. 3A, the user 100 is shown holding interface objects 104 while viewing the virtual reality scene 202b via the HMD 102. The virtual reality scene 202b includes a content item 204d representing a treasure chest that is placed on the floor. As noted above, as the user 100 interacts with the virtual reality scene 202b, the system is configured to track the eye gaze of the user and the gestures of the user during the user's interaction with the game scene.

For example, referring to FIG. 3B, the eye gaze 106 of the user is focused on the treasure chest. The eye gaze 106 data of the user and any other information associated with the eyes (e.g., pupillary light reflex, pupil size, eye movement, etc.) are tracked and processed by the system to identify a content item that may be of potential focus of interactivity by the user. As further illustrated, gesture 206c illustrates the body position of the user 100 at a position that is more proximate to the treasure chest compared to the body position of the user shown in FIG. 3A. Using the gaze information and gestures performed by the user, the system is configured to generate a prediction of interaction with the treasure chest and graphics data corresponding to the treasure chest is retrieved from data storage and stored into system memory.

As illustrated in the example shown in FIG. 3B, the eye gaze 106 or the gesture 206c can initiate a pre-fetching operation that is configured to access and load graphics data corresponding to the treasure chest into system memory. As the user 100 walks toward the treasure chest while maintaining their eye gaze 106 on the treasure chest, graphics data related to the treasure chest (e.g., content items, geometry, vertices, depth, color, lighting, shading, texturing, motion, etc.) is loaded into system memory in anticipation that the user may want to interact with the treasure chest. In the example shown in FIG. 2B, graphics data related to the contents of the treasure chest is loaded into system memory in anticipation that the user may open the treasure chest to discover and see what may be inside, e.g., gold, silver, jewels, etc.

In other embodiments, if the eye gaze of the user is no longer directed at the treasure chest or if the gestures 206 of the user suggest that the user is no longer interested in the treasure chest, the system is configured to pause loading of the graphics data into system memory and may resume loading of the graphics data at a later point in time when the user shows interest in interacting with the treasure chest. In some embodiments, if the eye gaze of the user is no longer directed at the identified treasure chest or if the gestures 206 of the user suggest that the user is no longer interested in the treasure chest, the graphics data corresponding to the content item 204d treasure chest is removed from system memory.

Referring to FIG. 3C, while the eye gaze 106 of the user is focused on the treasure chest, gesture 206d illustrates the user reaching in in a direction toward the treasure chest to explore its contents. As shown in the virtual reality scene 202b, the virtual arm 100' of the user is shown opening the lid of the treasure chest. In one embodiment, when the hand of the user touches the lid of the treasure chest, the system is configured to fetch the graphics data that corresponds to the contents of the treasure chest from system memory to render the contents of the treasure chest, e.g., gold coins. In this way, since the graphics data for the gold coins is stored in system memory, the detailed graphics (e.g., high definition resolution) of the gold coins can be quickly rendered and delays related to rendering the gold coins or contents of the treasure chest can be prevented. Accordingly, the system described with respect to FIGS. 3A-3C provides a way of tracking the gaze and gestures of the user to identify content items in the scene that can be pre-fetched and loaded into system memory and used for rendering content items in the scene that might be of interest to the user. Doing this can help eliminate delays in rendering the game scene during the user's interaction with the virtual reality scene 202.

Figure 4:
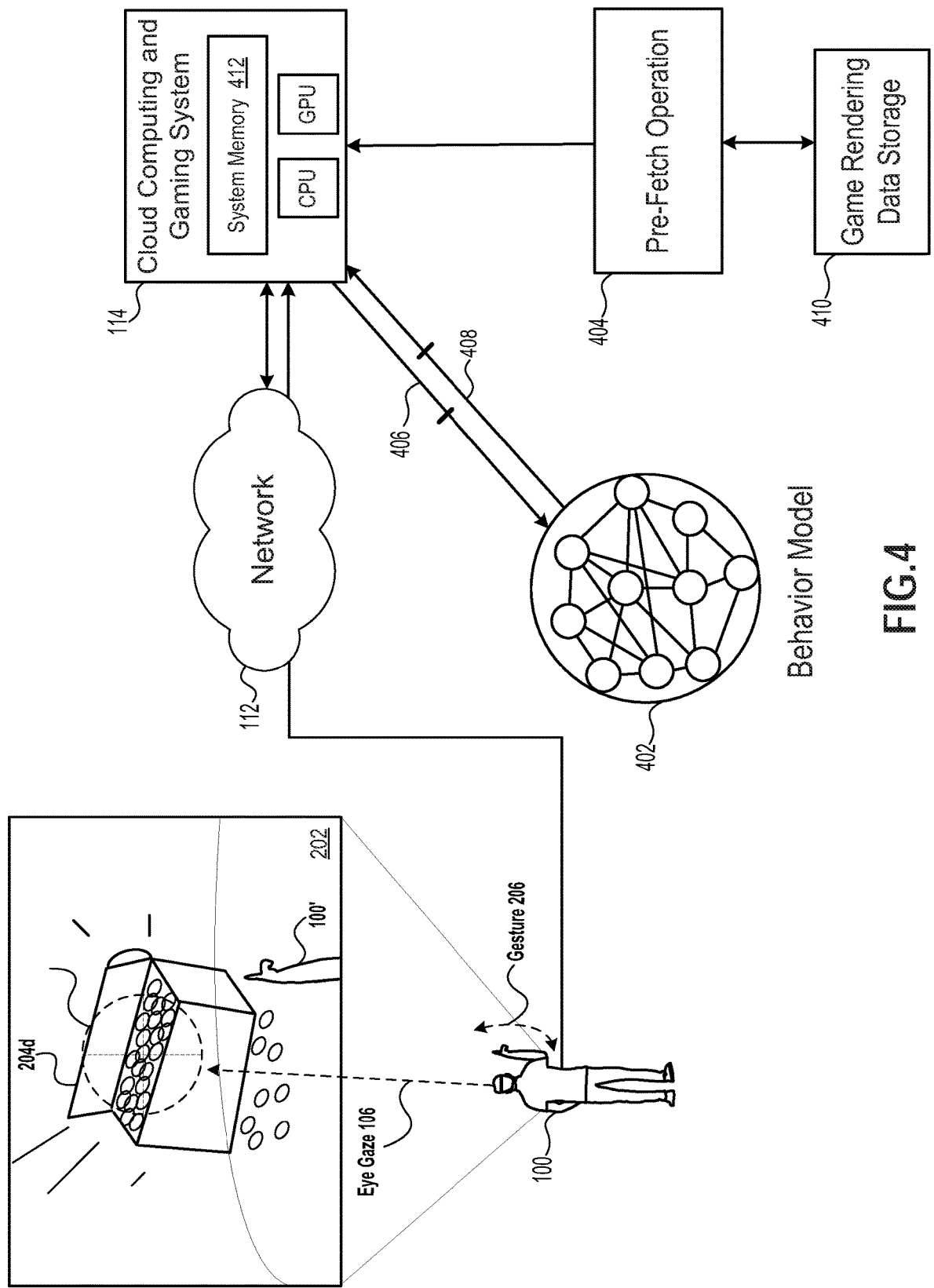
FIG. 4 illustrates an embodiment of a system for fetching graphics data corresponding to an identified content item for rendering in a game scene, in accordance with an implementation of the disclosure.

FIG. 4 illustrates an embodiment of a system for fetching graphics data corresponding to an identified content item for rendering in a game scene. The figure shows a method for fetching graphics data for loading into system memory 412 using a behavior model 402, and additionally, using input data 406 such as gaze information for a user, gestures of a user, and interactive data (e.g., gameplay data) as inputs. In one embodiment, during the gameplay of the user 100, the eye gaze 106 and gestures 206 of the user 100 are tracked and transmitted to the cloud computing and gaming system 114 over the network 112.

The method then flows to the behavior model 402 which is configured to receive the input data 406 such as gaze information for the user, gestures of the user, and the interactive data. In some embodiments, other inputs that are not direct inputs may also be taken as inputs to the behavior model 402. During the gameplay of the user, the behavior model 402 may also use a machine learning model that is used to identify content items in the scene as being a potential focus of interactivity by the user and to generate a prediction of interaction 408 with the content item by the user. The behavior model 402 may also be used to identify patterns, similarities, and relationships between the gaze information for the user, gestures of the user, and the interactive data. Using the patterns, similarities, and relationships, the behavior model 402 may be used to identify content items in the scene that may be of potential focus to the user and a prediction of interaction 408 by the user. In one embodiment, the prediction of interaction 408 may include a wide range of interaction types that the user may perform in the game. Such predicted interactions may be include the user reaching for the identified content item to view more details on the content item, touching the content item to see how it feels, exploring contents stored inside the content item, opening a door to explore what is located on the other side, etc. Over time, the behavior model 402 is trained to predict a likelihood of the user interacting with specific content items in the game scene and the amount of graphics data used for rendering the content items can be adjusted based the prediction.

After identifying content items 204 in the scene as being a potential focus of interactivity by the user and generating a prediction of interaction 408 with the content items 204 by the user, the method flows to the cloud computing and gaming system 114 where the cloud computing and gaming system 114 is configured to process the identified content items 204 and the prediction of interaction 408. In some embodiments, using the prediction of interaction 408 with the content items 204, a pre-fetching operation 404 can be utilized to access graphics data corresponding to the identified content items 204 from a game rendering data storage 410. In one embodiment, the pre-fetching operation 404 is configured to make adjustments to increase or decrease an amount of the graphics data to access and load into system memory 412 based on updates to the prediction of interaction 408. For example, if the eye gaze of the user is focused on an array of different content items, the pre-fetching operation 404 may increase the amount of graphics data for the content item that the eye gaze of the user is primarily focused on while decreasing the amount of graphics data for the content items that the eye gaze of the user is less focused on.

In one embodiment, the graphics data can be used to render the specific content item 204 or to further enhance the image quality (e.g., coarseness, curvature, geometry, vertices, depth, color, lighting, shading, texturing, motion, etc.) of a particular content item 204. After accessing the graphics data, the graphics data is loaded and stored into system memory 412 and can be used by the CPU and GPU to render the content item 204 in the scene, or to render a higher resolution, or to enhance the image quality of the content item 204.

For example, as shown in FIG. 4, the user 100 is shown opening the lid of the treasure chest (e.g., content item 204*d*) while directing their eye gaze 106 on the treasure chest. A virtual arm 100' representing the arm of the user is shown in the virtual reality scene 202 opening the lid of the treasure chest to explore the contents of the treasure chest. Using the eye gaze 106 of the user, gesture 206 of the user, and the interactive data, the behavior model 402 can generate a prediction of interaction 408 that includes the user 100 wanting to dig through the contents of the treasure chest to view its contents. Using the prediction of interaction 408, the cloud computing and gaming system 114 can access and load graphics data related to the contents of the treasure chest since it is predicted that the user may want to sort through all the contents to see what is in the treasure chest. After storing the graphics data related to the contents of the treasure chest into system memory 412, the graphics data can be used to render the contents of the treasure chest when the user 100 begins to sort through the contents of the treasure chest. In this way, as the user explores the contents, the image of the contents of the treasure chest can be seamlessly rendered in high resolution without any delays or lag time.

FIG. 5 illustrates an embodiment of a table 502 illustrating eye gaze information 504 and gestures 206 of a user that are tracked during gameplay of the user, and a generated prediction of interaction 408 with the content item 204 by the user. As shown, the table 502 includes gaze information 504 and the gestures 206 of the user that are tracked while the user interacts with a game scene. As further illustrated in the table, a content item 204 in the game scene is identified as being a potential focus of interactivity based on the corresponding gaze information 504 and the gestures 206 of the user. In one embodiment, the gaze information 504 may include the eye gaze 106 of the user and other information associated with the eyes of the user that is captured during the user's gameplay, e.g., eye movement, pupillary light reflex, pupil size, etc. In some embodiments, the gestures 206 of the user are tracked during the gameplay which may include various body movements and body language data that is processed to help determine a prediction of interaction 408 with the content item in the scene.

To provide an illustration of table 502 in FIG. 5, in one example, the system may determine that based on the game scene context 506, the user is in a scene that involves a fight with an enemy character (e.g., Cyberdemon). During the user's interaction with the scene, the system may determine that the eyes of the user are blinking fast while the eye gaze is focused on the exit door. The gesture of the user may indicate that the hands of the user are fidgeting and that the user is frightened by the thought of having to fight the enemy character without the appropriate weapons. The noted information can be processed and received by a behavior model 402 which can be used to generate a prediction of interaction 408 that includes the user running toward the exit door to escape or to locate weapons. Using the prediction of interaction, the system is configured to access and load graphics data related to contents that may be located on the other side of the exit door when the user opens the door to escape. Accordingly, with the graphics data loaded into the system memory, the CPU and GPU can access the graphics data and render images of the contents of the scene that may be located behind the exit door.

Figure 6:
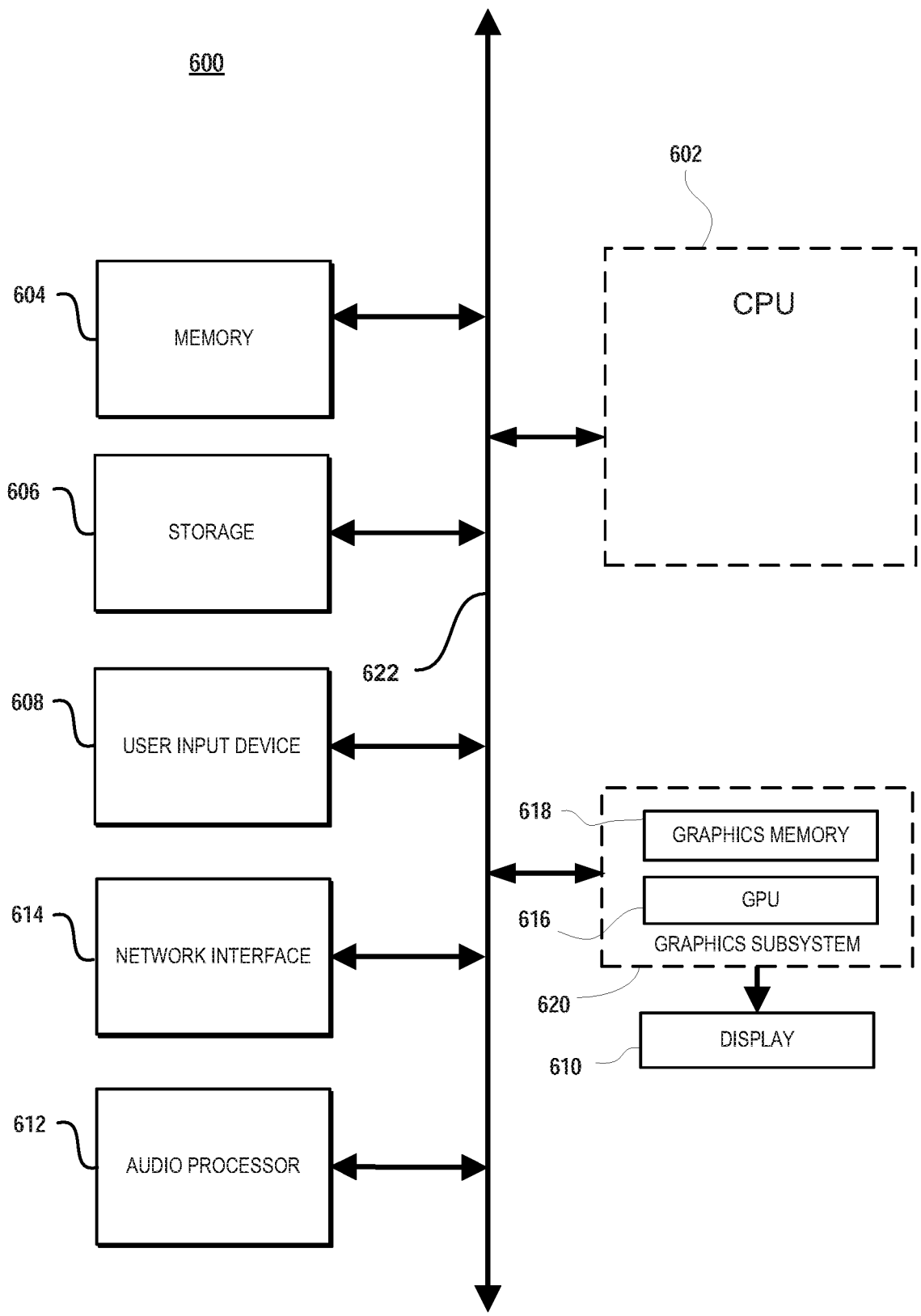
FIG. 6 illustrates components of an example device that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for fetching graphics data for rendering a scene presented on a display, comprising:
    receiving gaze information for eyes of a user while the user is interacting with the scene;
    tracking gestures of the user while the user is interacting with the scene;
    identifying a content item in the scene as being a potential focus of interactivity by the user, the content item is a virtual object that is configured for interaction in the scene, wherein said identifying the content item in the scene is assisted by a machine learning model;
    processing the gaze information and the gestures of the user to generate a prediction of interaction with the content item by the user, the prediction of interaction uses a behavior model and said machine learning model to identify relationships between the gaze information of the user while the user is interacting in the scene and the gestures of the user while the user is interacting in the scene to predict a likelihood of the user interacting with said content item;
    processing a pre-fetching operation to access and load the graphics data associated with said content item into system memory based on said predicted likelihood in anticipation of the user interacting with the content item; and
    rendering the content item at an increased image quality in the scene using said pre-fetched graphics data in anticipation of the user interacting with the content item.

2. The method of claim 1, wherein the pre-fetching operation is adjusted to increase or decrease an amount of the pre-fetched graphics data to access and load into the system memory based on updates to the prediction of interaction.

3. The method of claim 1, wherein an amount of the pre-fetched graphics data used for the rendering of the content item is further based on a length of time that an eye gaze of the user is maintained on the content item.

4. The method of claim 3, wherein the amount of the pre-fetched graphics data used for the rendering is dynamically adjusted based on learning that the user has previously interacted with the content item in the scene.

5. The method of claim 1, wherein the pre-fetched graphics data is used for rendering another content item in the scene in anticipation of the user interacting with said another content item.

6. The method of claim 1, wherein the gestures of the user is head movement, hand movement, body movement, position of the user relative to the content item, body language signals, or a combination of two or more thereof.

7. The method of claim 1, wherein the gaze information include eye gaze of the user, pupil size, eye movements, or a combination of two or more thereof.

8. The method of claim 1, wherein the pre-fetched graphics data include information related to the identified content item, said information include coarseness, curvature, geometry, vertices, depth, color, lighting, shading, texturing, or a combination of two or more thereof.

9. The method of claim 1, further including:
rendering additional details related to the content item using the pre-fetched graphics data to increase the image quality of the content item.

10. The method of claim 1, further including:
rendering other content items in the scene using the pre-fetched graphics data in anticipation of the user interacting with said other content items.

11. The method of claim 1, wherein in addition to the behavior model identifying relationships between the gaze information and the gestures, the behavior model further processes interactive data input by said user when interacting with the scene.

12. A system for fetching graphics data for rendering a scene presented on a display, comprising a server configured to:
receive gaze information for eyes of a user while the user is interacting with the scene;
track gestures of the user while the user is interacting with the scene;
identify a content item in the scene as being a potential focus of interactivity by the user, the content item is a virtual object that is configured for interaction in the scene, wherein said identifying the content item in the scene is assisted by a machine learning model;
process the gaze information and the gestures of the user to generate a prediction of interaction with the content item by the user, the prediction of interaction uses a behavior model and said machine learning model to identify relationships between the gaze information of the user while the user is interacting in the scene and the gestures of the user while the user is interacting in the scene to predict a likelihood of the user interacting with said content item;
process a pre-fetching operation to access and load the graphics data associated with said content item into system memory based on said predicted likelihood in anticipation of the user interacting with the content item; and
rendering the content item at an increased image quality in the scene using said pre-fetched graphics data in anticipation of the user interacting with the content item.

13. The system of claim 12, wherein the pre-fetching operation is adjusted to increase or decrease an amount of the pre-fetched graphics data to access and load into the system memory based on updates to the prediction of interaction.

14. The system of claim 12, wherein the server is further configured to render additional details related to the content item using the pre-fetched graphics data to increase the image quality of the content item based on additional detected interaction with the content item by the user.

15. The system of claim 12, wherein in addition to the behavior model identifying relationships between the gaze information and the gestures, the behavior model further processes interactive data input by said user when interacting with the scene.

* * * * *